(12) United States Patent
Uchii et al.

(10) Patent No.: US 10,080,384 B2
(45) Date of Patent: Sep. 25, 2018

(54) ORAL TOBACCO COMPOSITION

(71) Applicant: JAPAN TOBACCO INC., Tokyo (JP)

(72) Inventors: Kimitaka Uchii, Tokyo (JP); Kazuhiko Katayama, Tokyo (JP); Takuma Nakano, Tokyo (JP); Manabu Yamada, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 175 days.

(21) Appl. No.: 15/142,523

(22) Filed: Apr. 29, 2016

(65) Prior Publication Data

US 2016/0242458 A1  Aug. 25, 2016

Related U.S. Application Data

(63) Continuation of application No. PCT/JP2014/078983, filed on Oct. 30, 2014.

(30) Foreign Application Priority Data

Oct. 31, 2013 (JP) ................. 2013-226406

(51) Int. Cl.

| | | |
|---|---|---|
| *A24B 13/00* | (2006.01) | |
| *B24B 15/00* | (2006.01) | |
| *A23G 4/06* | (2006.01) | |
| *A23G 4/20* | (2006.01) | |
| *A24B 15/30* | (2006.01) | |
| *A24B 15/32* | (2006.01) | |

(52) U.S. Cl.
CPC .............. *A24B 13/00* (2013.01); *A23G 4/068* (2013.01); *A23G 4/20* (2013.01); *A24B 15/303* (2013.01); *A24B 15/32* (2013.01)

(58) Field of Classification Search
CPC ......... A24B 15/32; A24B 13/00; A24B 15/30; A24B 15/303; A23G 4/068; A23G 4/20
See application file for complete search history.

(56) References Cited

U.S. PATENT DOCUMENTS

| | | | |
|---|---|---|---|
| 5,092,352 A | 3/1992 | Sprinkle, III et al. | |
| 2004/0118421 A1 | 6/2004 | Hodin et al. | |
| 2013/0206150 A1* | 8/2013 | Duggins | A24B 13/00 131/111 |
| 2015/0320077 A1* | 11/2015 | Wittorff | A24B 13/00 131/290 |

FOREIGN PATENT DOCUMENTS

| | | |
|---|---|---|
| CA | 939998 A | 1/1974 |
| JP | 55-19597 B1 | 5/1980 |
| WO | WO 2013/056709 A1 | 4/2013 |

* cited by examiner

*Primary Examiner* — Linda L Gray
(74) *Attorney, Agent, or Firm* — Birch, Stewart, Kolasch & Birch, LLP

(57) ABSTRACT

A chewable oral tobacco composition (1) including a tobacco raw material for eluting a tobacco component and a gum base comprises: a first gum portion (10) including the tobacco raw material and a first gum base; and a second gum portion (20) including a second gum base. The second gum portion does not include the tobacco raw material or includes the tobacco raw material in an amount less than an amount of the tobacco raw material included in the first gum portion. A weight of the first gum base is 0.3 g or more. Wt. % of the first gum base is 50 wt. % or more when wt. % of the first gum portion is 100 wt. %. Total wt. % of the first gum base and the second gum base is 50 wt. % or less when wt. % of the oral tobacco composition is 100 wt. %.

4 Claims, 4 Drawing Sheets

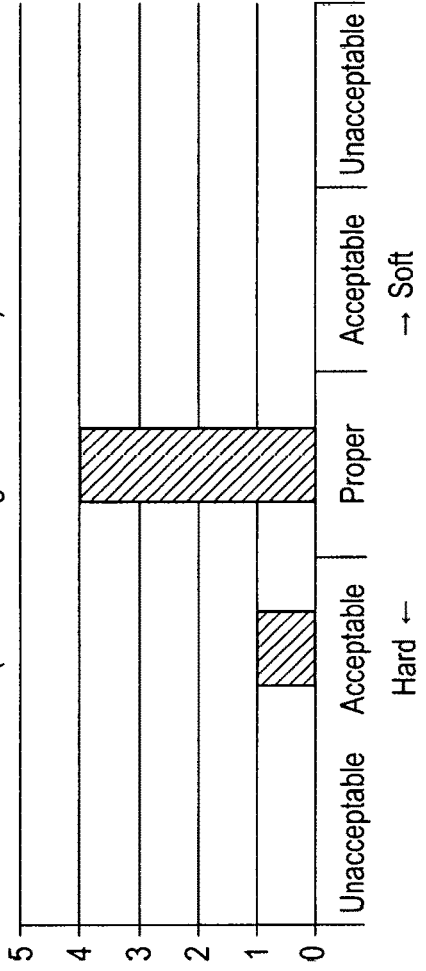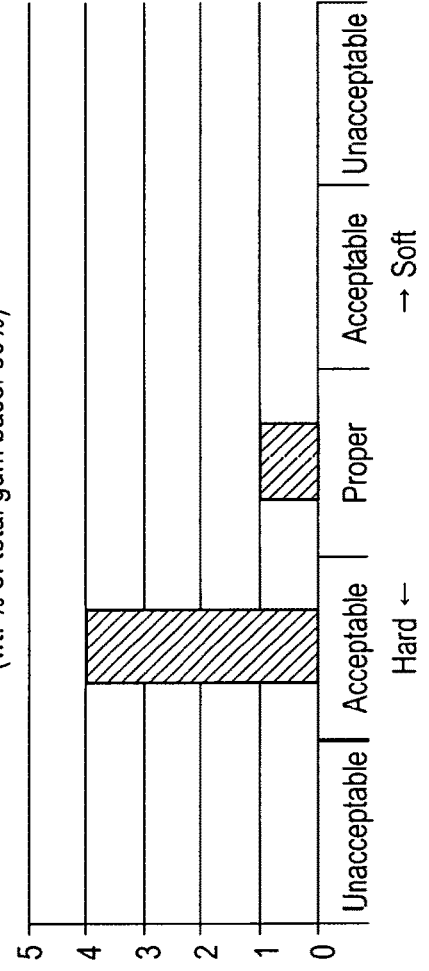

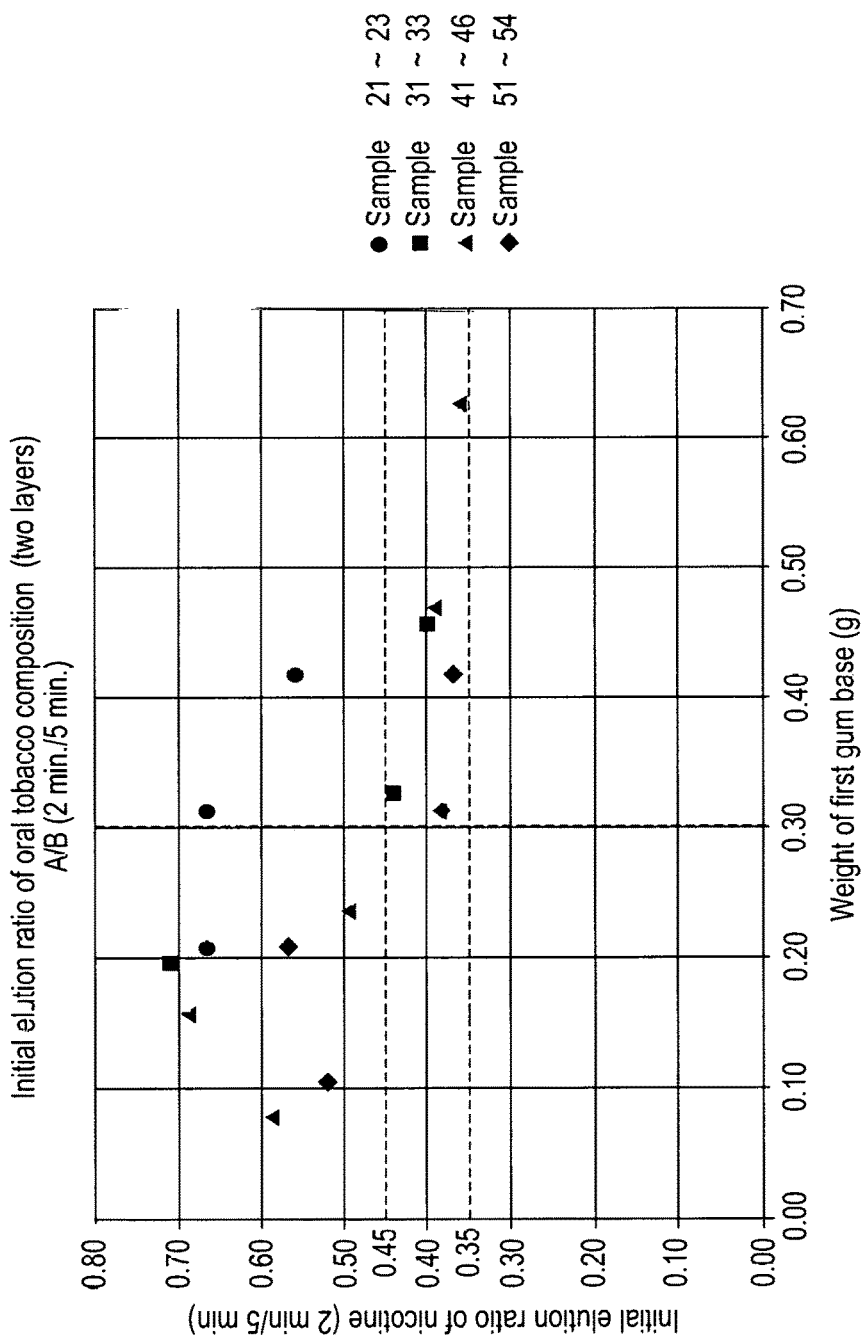

ORAL TOBACCO COMPOSITION

CROSS REFERENCE TO RELATED APPLICATIONS

This application is a Continuation of PCT International Application No. PCT/JP2014/078983, filed on Oct. 30, 2014, which claims priority under 35 U.S.C. 119(a) to Patent Application No. 2013-226406, filed in Japan on Oct. 31, 2013, all of which are hereby expressly incorporated by reference into the present application.

TECHNICAL FIELD

The present invention relates to an oral tobacco composition.

BACKGROUND ART

There is known a chewable oral tobacco composition comprising a gum base and a tobacco raw material for eluting a tobacco component. There are also various approaches for improving the flavor of the oral tobacco composition (the taste as a tobacco) (for example, see Patent Literature 1).

Patent Literature 1 discloses a technology for stabilizing variation in elution amount of a tobacco component, such as nicotine, included in a tobacco raw material, when chewed, by increasing the blending ratio of a gum base in the oral tobacco composition. Here, the wt. % of the gum base in the oral tobacco composition disclosed in Patent Literature 1 is 60 wt. % or more, thereby the variation in elution amount of the tobacco component is stabilized.

Such oral tobacco composition can elute the tobacco component stably when chewed, and thus, stably deliver the flavor from the tobacco component to a user.

However, the oral tobacco composition according to the background art has the following problem.

There is a problem that the oral tobacco composition hardens excessively due to the increased blending ratio of the gum base in the oral tobacco composition, resulting in deterioration of texture (mouthfeel or chewing property) given to a user.

CITATION LIST

Patent Literature

[Patent Literature 1] JP S55-19597A

SUMMARY

A summary of a first feature is a chewable oral tobacco composition including a tobacco raw material for eluting a tobacco component and a gum base, the oral tobacco composition comprising: a first gum portion including the tobacco raw material and a first gum base; and a second gum portion including a second gum base, wherein the second gum portion does not include the tobacco raw material or includes the tobacco raw material in an amount less than an amount of the tobacco raw material included in the first gum portion, a weight of the first gum base is 0.3 g or more, wt. % of the first gum base is 50 wt. % or more when wt. % of the first gum portion is 100 wt. %, and total wt. % of the first gum base and the second gum base is 50 wt. % or less when wt. % of the oral tobacco composition is 100 wt. %.

In the first feature, wt. % of the second gum base may be 30 wt. % or less when wt. % of the second gum portion is 100 wt. %.

In the first feature, total wt. % of the first gum base and the second gum base may be 25 wt. % or more when wt. % of the oral tobacco composition is 100 wt. %.

In the first feature, a weight of the oral tobacco composition may range from 0.6 to 2.0 g.

BRIEF DESCRIPTION OF DRAWINGS

FIG. 2A is a graph representing texture evaluation results.
FIG. 2B is a graph representing texture evaluation results.

FIG. 3 is a graph representing a relationship between the weights of first gum bases in Table 4 and the initial elution ratios in Table 4.

DESCRIPTION OF EMBODIMENTS

Figure 1:
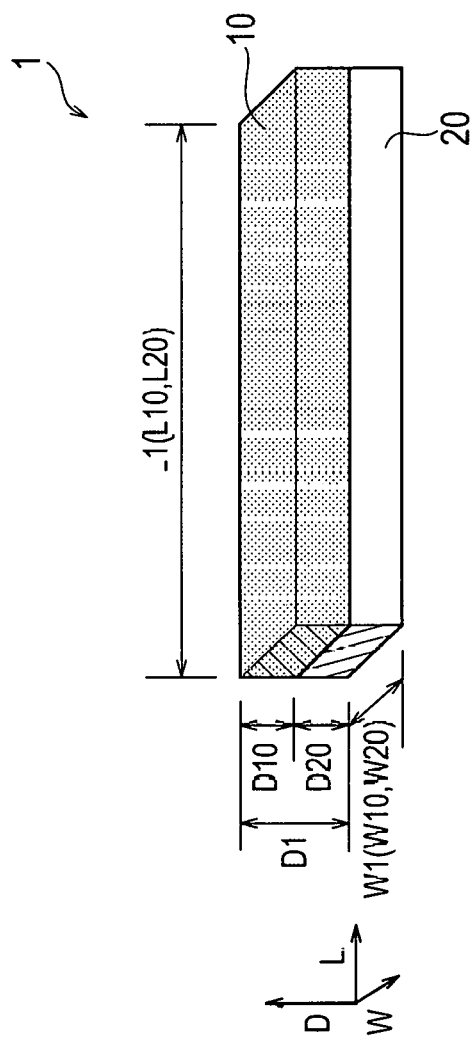
FIG. 1 is a perspective view of an oral tobacco composition according to an embodiment.

Hereinafter, the embodiments of the present invention will be described with reference to the drawings. In the following drawings, identical or similar components are denoted by identical or similar reference numerals. However, it should be noted that the drawings are schematically illustrated and the ratio and the like of each dimension are different from the real ones. Therefore, specific dimensions should be determined with reference to the description below. It is needless to mention that different relationships and ratio of dimensions may be included in different drawings.

An Embodiment

An oral tobacco composition 1 according to an embodiment will be described below with reference to the drawings. The oral tobacco composition 1 according to the embodiment is a chewable oral tobacco composition (i.e., tobacco gum) including a tobacco raw material for eluting a tobacco component and a gum base. In the embodiment, nicotine is contemplated as the tobacco component.

FIG. 1 is a perspective view of the oral tobacco composition 1 according to the embodiment. It is noted that the oral tobacco composition 1 illustrated in FIG. 1 is contemplated as a single piece of the oral tobacco composition to be chewed by a user.

As illustrated in FIG. 1, the oral tobacco composition 1 according to the embodiment has a first gum portion 10 including the tobacco raw material and a first gum base, and a second gum portion 20 including a second gum base. That is, the oral tobacco composition 1 according to the embodiment is configured by two-layer structure.

Generally, in the oral tobacco composition, it is important to properly control the nicotine elution amount when chewed, thereby reducing the temporal variation of stimulation strength caused by nicotine, in order to prevent deterioration in flavor (taste as a tobacco) delivered to a user when chewed. In other words, it is important to reduce the temporal variation of stimulation strength by achieving stable elution of the nicotine included in the tobacco raw material at a temporally constant rate. Thereby, it is possible to deliver stable flavor to a user.

In addition, in the oral tobacco composition 1, it is also important to properly control the texture given to a user when chewing.

The inventors focused on the following points from these viewpoints. First, the inventors focused on improvement on a nicotine elution amount and texture that are given to a user within a certain period when chewing. In particular, the inventors focused on an initial period from the start of the chewing until a lapse of 5 minutes, as the certain period to be targeted. The defined time period from the start of the chewing until a lapse of 5 minutes is contemplated as a time period which is needed by a user who takes a smoke.

The inventors also define an intermediate time point within the initial period from the start of the chewing (0 minute) until a lapse of 5 minutes, in order to confirm that the nicotine elution at a temporally constant rate is achieved during the initial period from the start of the chewing until a lapse of 5 minutes. In the embodiment, the intermediate time point is defined as a time point after 2 minutes from the start of the chewing. One of the reasons for the definition is that the oral tobacco composition 1 after a lapse of 2 minutes from the start of the chewing tends to stabilize in the softened state while chewed. It is noted that such intermediate time point is not limited to the time point after a lapse of 2 minutes from the start of the chewing, and the intermediate time point may be set to any time point within the time period from the start of the chewing until a lapse of 5 minutes.

Although an exemplary case where the certain period to be targeted is defined as the initial period from the start of the chewing until a lapse of 5 minutes will be described in relation to the embodiment, the embodiment is not limited to that case. Accordingly, the embodiment can be applied to the cases where the certain period is defined as a time period other than the time period from the start of the chewing until a lapse of 5 minutes (for example, a time period until a lapse of 10 minutes).

In addition, the ratio A/B between the nicotine elution amount A (integrated value) from the start of the chewing until a lapse of 2 minutes and the nicotine elution amount B (integrated value) from the start of the chewing until a lapse of 5 minutes is preferably a value close to 0.4, such that a user feels an appropriate flavor during the initial period. In particular, it is preferable that the relationship $0.35 \leq A/B \leq 0.45$ is satisfied.

Therefore, the oral tobacco composition 1 according to the embodiment is configured such that the above-described A/B satisfies the relationship $0.35 \leq A/B \leq 0.45$.

Hereinafter, for the purpose of explanation, the nicotine elution amount A from the start of the chewing until a lapse of 2 minutes is represented as an elution amount after 2 minutes A, the nicotine elution amount B from the start of the chewing until a lapse of 5 minutes is represented as an elution amount after 5 minutes B, and A/B is represented as an initial elution ratio A/B.

The configuration of the oral tobacco composition 1 according to the embodiment will be described specifically on the basis of the above-described viewpoints.

In the embodiment, the total wt. % of the first gum base and the second gum base is 50 wt. % or less when the wt. % of the oral tobacco composition 1 is 100 wt. %. When the wt. % of the oral tobacco composition 1 is 100 wt. %, the total wt. % of the first gum base and the second gum base is preferably 25 wt. % or more, more preferably 30 wt. % or more, and still more preferably 35 wt. % or more.

This is because of the following reasons. When the total wt. % of the first gum base and the second gum base is 50 wt. % or less, the oral tobacco composition 1 is prevented from being excessively hard, and the deterioration of texture given to a user is suppressed. On the other hand, when the total wt. % of the first gum base and the second gum base is 25 wt. % or more, the oral tobacco composition 1 is prevented from being excessively soft as gum. Therefore, in this case, the deterioration of texture in the viewpoint of being excessively soft is suppressed.

Here, the total gum base included in the oral tobacco composition 1 is configured by the first gum base and the second gum base. In other words, the total wt. % of the first gum base and the second gum base is the wt. % of the total gum base included in the oral tobacco composition 1.

The weight of the oral tobacco composition 1 preferably ranges from 0.6 to 2.0 g. This is because of the following reasons. When the weight of the oral tobacco composition 1 is more than 2.0 g, the size of the oral tobacco composition 1 becomes too large as a single piece of the oral tobacco composition 1 to be chewed by a user, resulting in difficulty in chewing it. On the other hand, when the weight of the oral tobacco composition 1 is less than 0.6 g, the size of the oral tobacco composition 1 becomes too small as a single piece of the oral tobacco composition 1 to be chewed by a user, and the flavor tends not to be delivered to the user when chewed by the user. In the embodiment, the case where the weight of the oral tobacco composition 1 is 1.3 g will be described as an example.

(Configuration of First Gum Portion)

Next, the configuration of the first gum portion 10 according to the embodiment will be specifically described. The first gum portion 10 according to the embodiment includes a first gum base, a tobacco raw material, and another additive raw material.

Resins commonly used as a gum base may be applicable as the first gum base. For example, vegetable resins such as chicle, etc. or vinyl acetate resins, or mixtures thereof may be applicable as the first gum base.

As the tobacco raw material, for example, a tobacco raw material from a raw material species widely used for common tobacco products, such as Burley or Flue-cured, may be applicable. It is noted that the amount of the tobacco raw material included in the first gum portion is preferably chosen by taking the nicotine amount included in the tobacco raw material and the nicotine amount to be included in the oral tobacco composition 1 into consideration. For example, the amount of the tobacco raw material included in the first gum portion preferably ranges from 1 to 60 mg, more preferably from 10 to 30 mg.

In addition, the nicotine amount included in the first gum portion preferably ranges from 0.1 to 3.0 mg, more preferably from 0.5 to 2.0 mg.

Various materials used in tobacco products and chewing gum may be applicable as the another additive raw material. In particular, at least one of perfumes such as menthol, sugar raw materials, and the like may be applicable as the another additive raw material.

Further, in the embodiment, the weight of the first gum base in the first gum portion 10 is 0.3 g or more. Further, in the embodiment, the wt. % of the first gum base is 50 wt. % or more when the wt. % of the first gum portion 10 is 100 wt. %.

This is because of the following reasons. When the weight of the first gum base is less than 0.3 g, the initial elution ratio A/B of the nicotine does not satisfy the relationship $0.35 \leq A/B \leq 0.45$, whether the wt. % of the first gum base on the basis of the first gum portion is 50 wt. % or more, or not. Further, when the wt. % of the first gum base is less than 50 wt. % on the basis of the first gum portion 10, the initial elution ratio A/B of the nicotine does not satisfy the relationship $0.35 \leq A/B \leq 0.45$, whether the weight of the first gum base is 0.3 g or more, or not.

That is, in the context of the oral tobacco composition 1 according to the embodiment, when the weight of the first gum base is 0.3 g or more, and the wt. % of the first gum base is 50 wt. % or more on the basis of the first gum portion 10, the initial elution ratio AB of the nicotine can satisfy the relationship $0.35 \leq A/B \leq 0.45$.

Further, the wt. % of the first gum base is preferably 99 wt. % or less when the wt. % of the first gum portion 10 is 100 wt. %. This is because of the following reasons. When the wt. % of the first gum base is more than 99 wt. %, a sufficient amount of the tobacco raw material cannot be included in the first gum base, and thus, the flavor from the tobacco raw material may not be satisfactorily delivered to a user.

(Configuration of Second Gum Portion)

Next, the configuration of the second gum portion 20 will be described. The second gum portion 20 according to the embodiment includes the second gum base. Further, the second gum portion 20 preferably includes another additive raw material.

For the second gum base, similar materials to those of the first gum base may be applicable. Further, for the another additive raw material, similar materials to the another additive raw material for the first gum portion 10, such as perfumes (for example, menthol), may be applicable.

In the embodiment, the case where the second gum portion 20 does not include the tobacco raw material will be described as an example. It is noted that the second gum portion 20 may include the tobacco raw material in an amount less than the amount of the tobacco raw material included in the first gum portion 10, as long as the above-described initial elution ratio A/B of the nicotine satisfies the relationship $0.35 \leq A/B \leq 0.45$. For example, the second gum portion 20 may include 5% or less of the tobacco raw material on the basis of the tobacco raw material included in the first gum portion 10.

Further, when the wt. % of the second gum portion 20 is 100 wt. %, the wt. % of the second gum base is preferably determined such that the wt. % of the total gum base is 50 wt. % or less on the basis of the wt. % of the first gum base for the first gum portion 10.

As an example, the wt. % of the second gum base is preferably 30 wt. % or less on the basis of the second gum portion. In the case of the second gum portion 20 including an perfumes (for example, menthol, etc.), when the wt. % of the second gum base is 30 wt. % or less on the basis of the second gum portion, the flavor component is easily eluted from the perfume. This allows the oral tobacco composition to easily deliver the flavor from the flavor component to a user. On the other hand, the wt. % of the second gum base is preferably 20 wt. % or more on the basis of the second gum portion. When the wt. % of the second gum base is 20 wt. % or more on the basis of the second gum portion, the oral tobacco composition can retain its viscosity as gum, and the deterioration of texture given to a user is suppressed. From such viewpoint, it is particularly preferable that the wt. % of the second gum base is from 20 to 30 wt. % on the basis of the second gum portion.

The tobacco raw material included in the oral tobacco composition according to the embodiment preferably consists of a granular body having a particle diameter less than 0.5 mm, and more preferably, less than 0.35 mm. When the tobacco raw material included in the oral tobacco composition consists of the particles having the particle diameter less than 0.5 mm, the oral tobacco composition is less likely to give a foreign-body feeling when chewed to a user and deteriorated appearance of the product.

Further, as illustrated in FIG. 1, the oral tobacco composition 1 in the embodiment has a two-layer structure. Therefore, the thickness D1 of the oral tobacco composition 1 in the thickness direction D is the total value of the thickness D10 of the first gum portion 10 in the thickness direction D and the thickness D20 of the second gum portion 20 in the thickness direction D. Here, preferably, the thickness D10 of the first gum portion 10 in the thickness direction D is larger than the particle diameter of the tobacco raw material and is within a range of 7.0 mm or less. Preferably, the thickness D20 of the second gum portion 20 in the thickness direction D ranges from 0.1 to 6.0 mm.

In the embodiment, the case where the length L1 of the oral tobacco composition 1 in the lengthwise direction L equals the length L10 of the first gum portion 10 in the lengthwise direction L and the length L20 of the second gum portion 20 in the lengthwise direction L will be described as an example. Here, preferably, the length L1 (and L10, L20) of the oral tobacco composition 1 in the lengthwise direction L ranges from 10 to 75 mm.

In the embodiment, the case where the length W1 of the oral tobacco composition 1 in the widthwise direction W equals the length W10 of the first gum portion 10 in the widthwise direction W and the length W20 of the second gum portion 20 in the widthwise direction W will be described as an example. Here, the length W1 (and W10, W20) of the oral tobacco composition 1 in the widthwise direction W preferably ranges from 10 to 20 mm.

(Method for Manufacturing Oral Tobacco Composition)

Various methods may be applicable as a method for manufacturing the oral tobacco composition 1 according to the embodiment. For example, it is possible that once the first gum portion 10 and the second gum portion 20 are manufactured separately, the first gum portion 10 and the second gum portion 20 are bonded together to manufacture the oral tobacco composition 1.

In addition, the following method may be applicable as the method for manufacturing the oral tobacco composition 1.

Firstly, a kneader (BENCH KNEADER, item number PNV-1H from IRIE SHOKAI Co., Ltd.) is preheated to 60° C.

Secondly, a predetermined amount of the first gum base (CL-NTM2 from Fuji Chemical Industries, Ltd.) is placed into the kneader and kneaded for 10 minutes.

Thirdly, a sugar alcohol such as sorbitol, mannitol or erythritol, a saccharide such as glucose or sucrose, and if needed, another additive such as glycerin are added and the mixture is kneaded for 40 minutes.

Fourthly, an perfumes such as menthol and the tobacco raw material are added and the mixture is kneaded for 10 minutes. Thereby, a base body of the first gum portion can be manufactured.

Further, a base body of the second gum portion can be manufactured in a similar way without adding the tobacco raw material in the above-described step. Alternatively, when the second gum portion includes the tobacco raw material, a predetermined amount of the tobacco raw material may be included into the base body of the second gum portion in the above-described step such that the initial elution ratio A/B falls in a range satisfying the relationship 0.35≤A/B≤0.45.

Fifthly, the base body of the first gum portion and the base body of the second gum portion are laminated, and bonded together. Thereby, a base body of the oral tobacco composition can be manufactured.

Sixthly, the base body of the oral tobacco composition is cut into a predetermined amount while being formed into a predetermined shape. Thereby, the individual oral tobacco compositions 1 can be manufactured.

Further, the oral tobacco composition 1 (1.3 g), the first gum portion 10, and the second gum portion 20 may be configured as shown in Tables 1 to 3 below. It is noted that the last digits of the values shown in Tables 1 to 3 are rounded off.

TABLE 1

First gum portion 10

| Material | Rate | Weight (g) |
|---|---|---|
| First gum base (CLNTN2) | 60.0% | 0.31 |
| Sorbitol powder | 27.7% | 0.14 |
| Aqueous solution containing 71% sorbitol | 5.5% | 0.03 |
| Glycerin | 0.8% | 0.004 |
| Menthol | 2.0% | 0.01 |
| Tobacco (NBLL) | 4.0% | 0.02 |
| Total | 100.0% | 0.52 |

TABLE 2

Second gum portion 20

| Material | Rate | Weight (g) |
|---|---|---|
| Second gum base (CLNTN2) | 25.0% | 0.20 |
| Sorbitol powder | 59.7% | 0.47 |
| Aqueous solution containing 71% sorbitol | 11.7% | 0.09 |
| Glycerin | 1.5% | 0.01 |
| Menthol | 2.0% | 0.02 |
| Tobacco (NBLL) | — | — |
| Total | 100% | 0.78 |

TABLE 3

Oral tobacco composition 1

| Material | Rate | Weight (g) |
|---|---|---|
| Total gum base (CLNTN2) | 39.0% | 0.51 |
| Sorbitol powder | 46.9% | 0.61 |
| Aqueous solution containing 71% sorbitol | 9.2% | 0.12 |
| Glycerin | 1.2% | 0.02 |
| Menthol | 2.0% | 0.03 |
| Tobacco (NBLL) | 1.6% | 0.02 |
| Total | 100.0% | 1.30 |

(Operation and Effect)

The oral tobacco composition 1 according to the embodiment has the first gum portion 10 including the tobacco raw material and the first gum base, and the second gum portion 20 including the second gum base. Further, in the oral tobacco composition 1, the total wt. % of the first gum base and the second gum base is 50 wt. % or less, when the wt. % of the oral tobacco composition 1 is 100 wt. %.

Such configuration can prevent the oral tobacco composition 1 from being excessively hardened, suppressing the deterioration of texture given to a user.

In addition, the weight of the first gum base of the first gum portion 10 is 0.3 g or more, and the wt. % of the first gum base is 50 wt. % or more.

Such configuration allows the initial elution ratio A/B of the nicotine to satisfy the relationship 0.35≤A/B≤0.45. Therefore, when the weight of the first gum base is 0.3 g or more, and the wt. % of the first gum base is 50 wt. % or more, the variation in the nicotine elution amount can be suppressed such that an appropriate flavor can be delivered to a user during the initial period.

The oral tobacco composition 1 according to the embodiment can stably deliver the flavor from the tobacco component to a user when chewing, while giving a suitable texture to the user.

In addition, the total wt. % of the first gum base and the second gum base is preferably 25 wt. % or more, when the wt. % of the oral tobacco composition 1 is 100 wt. %. Such configuration can prevent the oral tobacco composition 1 from being excessively softened as gum. Therefore, in this case, the deterioration of texture given to a user in the viewpoint of being excessively soft can be suppressed.

Further, the wt. % of the second gum base is preferably 30 wt. % or less, when the wt. % of the second gum portion 20 is 100 wt. %. When the second gum portion 20 includes a perfume (such as menthol), such configuration allows the flavor component to be easily eluted from the perfume. This allows the oral tobacco composition to easily deliver the flavor from the flavor component to a user.

In addition, the weight of the oral tobacco composition 1 preferably ranges from 0.6 to 2.0 g. Such configuration can prevent the oral tobacco composition 1 from being excessively large or small as a single piece of the oral tobacco composition 1 to be chewed by a user, and also can ensure that the flavor is delivered to the user.

EXAMPLE

The following evaluation test was conducted in order to clarify the effect of the embodiment. The test method and results will be described below.

<Texture Evaluation Test>

Samples 11 to 12 were prepared and tested for evaluating the texture of the oral tobacco composition.

The sample 11 was adjusted such that the total wt. % of the first gum base (GB) and the second gum base (GB) is 40 wt. %, when the wt. % of the oral tobacco composition is 100 wt. %. In other words, the sample 11 was adjusted such that the wt. % of the total gum base (GB) is 40 wt. %.

The sample 12 was adjusted such that the total wt. % of the first gum base (GB) and the second gum base (GB) is 50 wt. %, when the wt. % of the oral tobacco composition is 100 wt. %. In other words, the sample 12 was adjusted such that the wt. % of the total gum base (GB) is 50 wt. %.

It is noted that the configuration of each of the sample 11 and the sample 12 is in common in the following points.

The total weight of the oral tobacco composition: 1.3 g

The wt. % of the second gum base (GB) on the basis of the second gum portion: 25 wt. %

(Test Method)

Organoleptic evaluations about textures for the above-described samples 11 and 12 were conducted on the basis of chewed by five adults. In particular, in order to conduct the organoleptic evaluations about the textures for the samples 11 and 12, these samples were chewed at a pace of 60 times per minute for a time period from the start of the chewing until a lapse of 5 minutes i.e., for a time period until the initial period has passed.

(Test Results)

The test results are illustrated in FIGS. 2A and 2B. FIG. 2A illustrates the texture evaluation results for the sample 11, and FIG. 2B illustrates the texture evaluation results for the sample 12.

As illustrated in FIGS. 2A and 2B, it is demonstrated that both of the sample 11 and the sample 12 fall in the acceptable range of the texture.

Here, as illustrated in FIG. 2B, the results for the sample 12 shows that its texture falls in the acceptable range, while it has a tendency to give a harder texture. Therefore, it is understood that the oral tobacco composition has a tendency to give a harder texture, when the wt. % of the total gum base is more than 50 wt. %.

It is understood that when the wt. % of the total gum base is more than 50 wt. %, deterioration of texture given to a user occurs. Therefore, the results of the texture evaluation test demonstrate that when the wt. % of the total gum base is 50 wt. % or less, the texture becomes excellent.

<Evaluation Test for Initial Elution Ratio>

Samples 21 to 23, samples 31 to 33, samples 41 to 46, and samples 51 to 54 were prepared and tested for evaluating initial elution ratios of the oral tobacco compositions during the initial period.

The samples 21 to 23 were adjusted and manufactured such that the wt. % of the first gum base (GB) is 40 wt. %, when the wt. % of the first gum portion is 100 wt. %.

The samples 31 to 33 were adjusted and manufactured such that the wt. % of the first gum base (GB) is 50 wt. %, when the wt. % of the first gum portion is 100 wt. %.

The samples 41 to 46 were adjusted and manufactured such that the wt. % of the first gum base (GB) is 60 wt. %, when the wt. % of the first gum portion is 100 wt. %.

The samples 51 to 54 were adjusted and manufactured such that the wt. % of the first gum base (GB) is 80 wt. %, when the wt. % of the first gum portion is 100 wt. %.

Further, the configuration of each of the above-described samples 21 to 54 is in common in the following points.

The total weight of the oral tobacco composition: 1.3 g

The wt. % of the second gum base (GB) on the basis of the second gum portion: 25%

The amount of the tobacco raw material in the first gum portion: 0.02 g

The nicotine content included in the oral tobacco composition: 1 mg

It is noted that the detail configurations of the above-described samples 21 to 54 are as shown in Table 4.

(Test Method)

Each of the above-described samples 21 to 54 were chewed by adults, and the nicotine elution amount A after 2 minutes from the start of the chewing and the nicotine elution amount B after 5 minutes from the start of the chewing were measured. The initial elution ratios A/B were calculated on the basis of the results. In this test method, each of the samples 21 to 54 was chewed at a pace of 60 times per minute.

The nicotine elution amounts A and B were measured according to the following method. In particular, for each of the above-described samples 21 to 54, the nicotine content before the start of the chewing, the nicotine content (the remaining amount) after 2 minutes from the start of the chewing, and the nicotine content (the remaining amount) after 5 minutes from the start of the chewing were measured.

It is noted that the nicotine elution amount A after 2 minutes from the start of the chewing was calculated on the basis of the difference between the nicotine content before the start of the chewing and the nicotine content (the remaining amount) after 2 minutes from the start of the chewing. On the other hand, the nicotine elution amount B after 5 minutes from the start of the chewing was calculated on the basis of the difference between the nicotine content before the start of the chewing and the nicotine content (the remaining amount) after 5 minutes from the start of the chewing.

In addition, the initial elution ratios A/B of the nicotine were calculated on the basis of the nicotine elution amount A after 2 minutes from the start of the chewing and the nicotine elution amount B after 5 minutes from the start of the chewing.

The nicotine contents (the remaining amounts) included in the samples were measured as follows.

Firstly, the whole amount of the sample is placed into a 50 ml screw vial, 15 ml of 11% sodium hydroxide aqueous solution is added, and then, 20 ml of a mixed solution of 1000 ml of n-hexane and 500 mg of n-heptadecane is added.

Secondly, the above-described screw vial is shielded from light by using aluminum foil, and then shaked for 18 hours.

Thirdly, the screw vial after the shaking is left at rest for about 1 hour.

Fourthly, the supernatant is collected, filtered by using a 0.45 μm membrane filter, and then analyzed by a gas chromatograph mass spectrometer (GCMS).

(Test Results)

Test results are shown in Table 4 and FIG. 3. FIG. 3 is a scatter diagram (graph) indicating a relationship between weights of the first gum base of the samples 21 to 54 in Table 4 and the initial elution ratio A/B of the samples 21 to 54 in Table 4.

As shown in Table 4 and FIG. 3, among the samples 21 to 54, it is understood that the samples 21 to 23 in which the wt. % of the first gum base is 40 wt. % have the initial elution ratios A/B larger than 0.45. That is, it is understood that when the wt. % of the first gum base is 40 wt. %, the initial elution ratio A/B is out of the range 0.35≤A/B≤0.45.

On the other hand, it is understood that the initial elution ratios A/B of the samples 31 to 54 in which the weight of the first gum base is less than 0.3 g are out of the range 0.35≤A/B≤0.45, even when the wt. % of the first gum base is 50 wt. % or more.

It is understood that the initial elution ratio A/B can be fallen in the range 0.35≤A/B≤0.45, when the weight of the first gum base is 0.3 g or more and when the wt. % of the first gum base is 50 wt. % or more.

Therefore, it is demonstrated that the variation in the nicotine elution amount can be suppressed, and an appropriate flavor can be delivered to a user during the initial period, when the weight of the first gum base is 0.3 g or more, and when the wt. % of the first gum base is 50 wt. % or more.

TABLE 4

| | | First gum portion | | | | | Elution amount of nicotine | | |
|---|---|---|---|---|---|---|---|---|---|
| | Second gum portion | Weight of tobacco | | | | Oral tobacco composition | Elution amount | Elution amount | Initial elution |
| Sample | GB wt. % | GB weight (g) | raw material (g) | GB wt. % | GB weight (g) | Total GB wt. % | after 2 minute | after 5 minute | ratio A/B |
| 21 | 25% | 0.195 | 0.0214 | 40% | 0.21 | 31% | 0.47 | 0.70 | 0.67 |
| 22 | 25% | 0.130 | 0.0214 | 40% | 0.31 | 34% | 0.45 | 0.67 | 0.67 |
| 23 | 25% | 0.065 | 0.0214 | 40% | 0.42 | 37% | 0.40 | 0.71 | 0.56 |
| 31 | 25% | 0.228 | 0.0214 | 50% | 0.20 | 33% | 0.58 | 0.81 | 0.71 |
| 32 | 25% | 0.163 | 0.0214 | 50% | 0.33 | 38% | 0.33 | 0.74 | 0.44 |
| 33 | 25% | 0.098 | 0.0214 | 50% | 0.46 | 43% | 0.29 | 0.74 | 0.40 |
| 41 | 25% | 0.293 | 0.0214 | 60% | 0.08 | 29% | 0.46 | 0.78 | 0.59 |
| 42 | 25% | 0.260 | 0.0214 | 60% | 0.16 | 32% | 0.55 | 0.80 | 0.69 |
| 43 | 25% | 0.228 | 0.0214 | 60% | 0.23 | 36% | 0.35 | 0.71 | 0.50 |
| 44 | 25% | 0.195 | 0.0214 | 60% | 0.31 | 39% | 0.25 | 0.65 | 0.39 |
| 45 | 25% | 0.130 | 0.0214 | 60% | 0.47 | 46% | 0.25 | 0.63 | 0.39 |
| 46 | 25% | 0.065 | 0.0214 | 60% | 0.62 | 53% | 0.20 | 0.57 | 0.36 |
| 51 | 25% | 0.293 | 0.0214 | 80% | 0.10 | 31% | 0.39 | 0.76 | 0.52 |
| 52 | 25% | 0.260 | 0.0214 | 80% | 0.21 | 36% | 0.43 | 0.75 | 0.57 |
| 53 | 25% | 0.228 | 0.0214 | 80% | 0.31 | 42% | 0.25 | 0.66 | 0.39 |
| 54 | 25% | 0.195 | 0.0214 | 80% | 0.42 | 47% | 0.25 | 0.67 | 0.37 |

Other Embodiments

Thus, the present invention has been explained in detail by using the above-described embodiments; however, it is obvious that persons skilled in the art will appreciate that the present invention is not limited to the embodiments explained herein.

For example, the embodiment can be changed as follows. In the above-described embodiment, the case where the oral tobacco composition 1 has a two-layer structure having the first gum portion 10 and the second gum portion 20 is described as an example. However, the structure is not limited thereto.

Figure 4A:
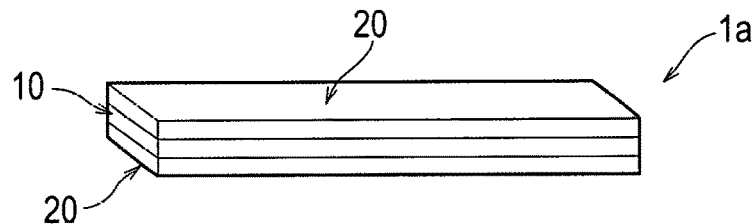
FIG. 4A is a perspective view of another aspect of the oral tobacco composition according to an embodiment.
Figure 4B:
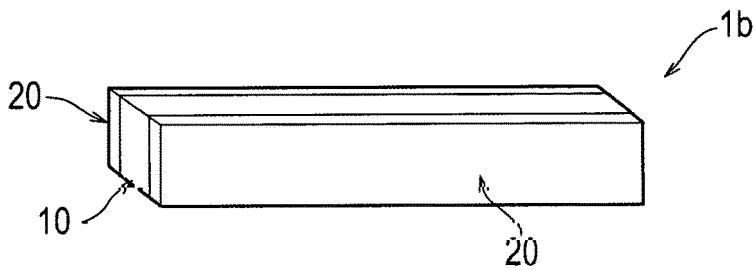
FIG. 4B is a perspective view of another aspect of the oral tobacco composition according to an embodiment.
Figure 4C:
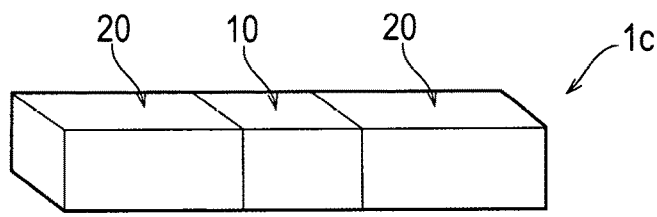
FIG. 4C is a perspective view of another aspect of the oral tobacco composition according to an embodiment.

For example, as in oral tobacco compositions 1a to 1c illustrated in FIGS. 4A to 4C, the oral tobacco composition may be configured by one layer of the first gum portion 10 and two layers of the second gum portion 20. That is, the oral tobacco composition may have a three-layer structure.

It is noted that the oral tobacco composition according to the embodiment is not limited to the oral tobacco compositions 1a to 1c illustrated in FIGS. 4A to 4C. For example, in the oral tobacco composition, the first gum portion 10 may be configured by a plurality of layers, and the second gum portion 20 may also be configured by a plurality of layers.

Figure 4D:
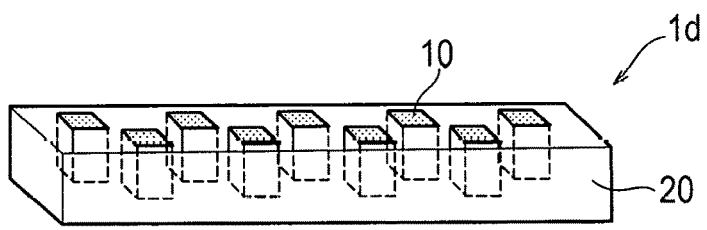
FIG. 4D is a perspective view of another aspect of the oral tobacco composition according to an embodiment.

In addition, as in an oral tobacco composition 1d illustrated in FIG. 4D, the oral tobacco composition may have the first gum portions 10 dispersively disposed in the second gum portion 20.

Further, the second gum portion 20 may be configured by a plurality of gum portions which have different tobacco raw material contents. For example, the second gum portion 20 may have a tobacco-free gum portion which does not include the tobacco raw material, and a tobacco-inclusion gum portion which includes the tobacco raw material. That is, various configurations for the second gum portion 20 in which the second gum portion 20 includes the tobacco raw material in an amount less than the amount of the tobacco raw material included in the first gum portion 10 can be employed as long as the initial elution ratio A/B of the nicotine satisfies the relationship $0.35 \leq A/B \leq 0.45$. In addition, the second gum portion 20 may have a low gum base portion which has a low second gum base content (wt. %), and a high gum base portion which has a high second gum base content (wt. %). That is, various configurations can be employed for the second gum portion 20 as long as the wt. % of the total gum base in the oral tobacco composition is 50 wt. % or less.

As such, the present invention can be implemented as modified and changed modes without departing from the gist and the scope of the present invention defined by the claims. Therefore, the description of the specification is intended for explaining the example only and does not impose any limited meaning to the present invention.

It is noted that the entire content of Japanese Patent Application No. 2013-226406 (filed on Oct. 31, 2013) is incorporated in the present specification by reference.

INDUSTRIAL APPLICABILITY

As described above, the present invention can provide the oral tobacco composition which can stably deliver the flavor from the tobacco component to a user when chewing, while giving a suitable texture to the user.

The invention claimed is:

1. A chewable oral tobacco composition including a tobacco raw material for eluting a tobacco component and a gum base, the oral tobacco composition comprising:
    a first gum portion including the tobacco raw material and a first gum base; and
    a second gum portion including a second gum base, wherein
    the second gum portion does not include the tobacco raw material or includes the tobacco raw material in an amount less than an amount of the tobacco raw material included in the first gum portion,
    a weight of the first gum base is 0.3 g or more,
    a wt. % of the first gum base is 50 wt. % or more when a wt. % of the first gum portion is 100 wt. %, and
    a total wt. % of the first gum base and the second gum base is 50 wt. % or less when a wt. % of the oral tobacco composition is 100 wt. %.

2. The oral tobacco composition according to claim 1, wherein the second gum portion comprises a perfume, and
a wt. % of the second gum base is 30 wt. % or less when a wt. % of the second gum portion is 100 wt. %.

3. The oral tobacco composition according to claim 1, wherein
the total wt. % of the first gum base and the second gum base is 25 wt. % or more but 50 wt. % or less when the wt. % of the oral tobacco composition is 100 wt. %.

4. The oral tobacco composition according to claim 1, wherein a weight of the oral tobacco composition is in the range from 0.6 to 2.0 g.

* * * * *